(12) United States Patent
Aichriedler

(10) Patent No.: US 10,348,430 B2
(45) Date of Patent: Jul. 9, 2019

(54) SYNCHRONIZATION MECHANISM FOR HIGH SPEED SENSOR INTERFACE

(71) Applicant: Infineon Technologies AG, Neubiberg (DE)

(72) Inventor: Leo Aichriedler, Puch (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/692,974

(22) Filed: Aug. 31, 2017

(65) Prior Publication Data

US 2018/0198546 A1 Jul. 12, 2018

Related U.S. Application Data

(60) Provisional application No. 62/444,687, filed on Jan. 10, 2017.

(51) Int. Cl.
| | |
|---|---|
| *H04J 3/06* | (2006.01) |
| *H04L 12/403* | (2006.01) |
| *G01D 21/00* | (2006.01) |
| *H04L 12/40* | (2006.01) |
| *H04L 7/033* | (2006.01) |
| *H04L 7/08* | (2006.01) |

(52) U.S. Cl.
CPC ........... *H04J 3/0682* (2013.01); *G01D 21/00* (2013.01); *H04J 3/0635* (2013.01); *H04J 3/0652* (2013.01); *H04L 12/403* (2013.01); *H04J 3/0638* (2013.01); *H04J 3/0658* (2013.01); *H04J 3/0679* (2013.01); *H04L 7/033* (2013.01); *H04L 7/0334* (2013.01); *H04L 7/08* (2013.01); *H04L 2012/40273* (2013.01)

(58) Field of Classification Search
CPC ............ H04L 2012/4073; H04L 12/40; H04L 12/403; H04L 2012/40267; H04L 7/033; H04L 7/0331; H04L 7/0334; H04L 7/0337; H04J 3/06; H04J 3/0635; H04J 3/0638; H04J 3/0658; H04J 3/0682; H04J 3/0679

See application file for complete search history.

(56) References Cited

U.S. PATENT DOCUMENTS

| | | | |
|---|---|---|---|
| 7,487,022 B2 | 2/2009 | Glaser | |
| 7,583,560 B2 * | 9/2009 | Chamberlain | G01V 1/22 367/50 |
| 8,654,988 B2 | 2/2014 | Jia et al. | |
| 8,948,280 B2 * | 2/2015 | Hammerschmidt | H04L 7/10 375/260 |

(Continued)

FOREIGN PATENT DOCUMENTS

| | | |
|---|---|---|
| CN | 102047594 A | 5/2011 |
| CN | 102640437 A | 8/2012 |

(Continued)

*Primary Examiner* — Mewale A Ambaye
(74) *Attorney, Agent, or Firm* — Harrity & Harrity, LLP

(57) ABSTRACT

A sensor may determine a sampling pattern based on a group of synchronization signals received by the sensor. The sampling pattern may identify an expected time for receiving an upcoming synchronization signal. The sensor may trigger, based on the sampling pattern, a performance of a sensor operation associated with the upcoming synchronization signal. The performance of the sensor operation may be triggered before the upcoming synchronization signal is received.

20 Claims, 8 Drawing Sheets

(56) References Cited

U.S. PATENT DOCUMENTS

| | | | |
|---|---|---|---|
| 10,053,141 B2 | 8/2018 | Suzuki et al. | |
| 2009/0190571 A1 | 7/2009 | Kitz et al. | |
| 2011/0134906 A1 | 6/2011 | Garudadri et al. | |
| 2015/0351057 A1* | 12/2015 | Akita | H04W 56/001 370/350 |
| 2016/0190863 A1* | 6/2016 | Ogasawara | G04G 19/00 368/47 |

FOREIGN PATENT DOCUMENTS

| | | |
|---|---|---|
| CN | 106254057 A | 12/2016 |
| KR | 101068003 B1 | 9/2011 |
| KR | 101619628 B1 | 5/2016 |

* cited by examiner

SYNCHRONIZATION MECHANISM FOR HIGH SPEED SENSOR INTERFACE

RELATED APPLICATION

This application claims priority under 35 U.S.C. § 119 to U.S. Provisional Patent Application No. 62/444,687, filed on Jan. 10, 2017, the content of which is incorporated by reference herein in its entirety.

BACKGROUND

A sensor (e.g., a speed sensor, a position sensor, an angle sensor, a temperature sensor, a current sensor, and/or the like) may be used to provide feedback information in a mechatronic system by, for example, operating as an interface between the mechanical domain and the electrical domain. In some cases, a physical position of the sensor is dependent on mechanical constraints of the mechatronic system, such as available physical space, accessibility to a sensing target (e.g., a target wheel, a shaft end, and/or the like). Thus, in some applications, the sensor cannot be integrated with an electronic control unit (ECU) and must operate as a standalone (i.e., remote) sensor that is connected to the ECU via a wired interface.

SUMMARY

According to some possible implementations, a sensor may include one or more components to determine a sampling pattern based on a group of synchronization signals received by the sensor, wherein the sampling pattern may identify an expected time for receiving an upcoming synchronization signal; and trigger, based on the sampling pattern, a performance of a sensor operation associated with the upcoming synchronization signal, wherein the performance of the sensor operation may be triggered before the upcoming synchronization signal is received.

According to some possible implementations, a system may include a sensor to determine a sampling pattern based on a group of synchronization signals received by the sensor, wherein the sampling pattern may identify a time at which an upcoming synchronization signal is expected to be received by the sensor; and perform, based on the sampling pattern, a sensor operation associated with the upcoming synchronization signal, wherein the sensor operation may be performed such that sensor data, associated with the sensor operation, is ready to be transmitted by the time at which the upcoming synchronization signal is expected to be received.

According to some possible implementations, a method may include determining a sampling pattern based on receiving a group of synchronization signals, wherein the sampling pattern may identify an expected time for receiving an upcoming synchronization signal; and triggering and based on the sampling pattern, a performance of a sensor operation associated with the upcoming synchronization signal, wherein the performance of the sensor operation may be triggered before the upcoming synchronization signal is received by a sensor.

DETAILED DESCRIPTION

Figure 1A:
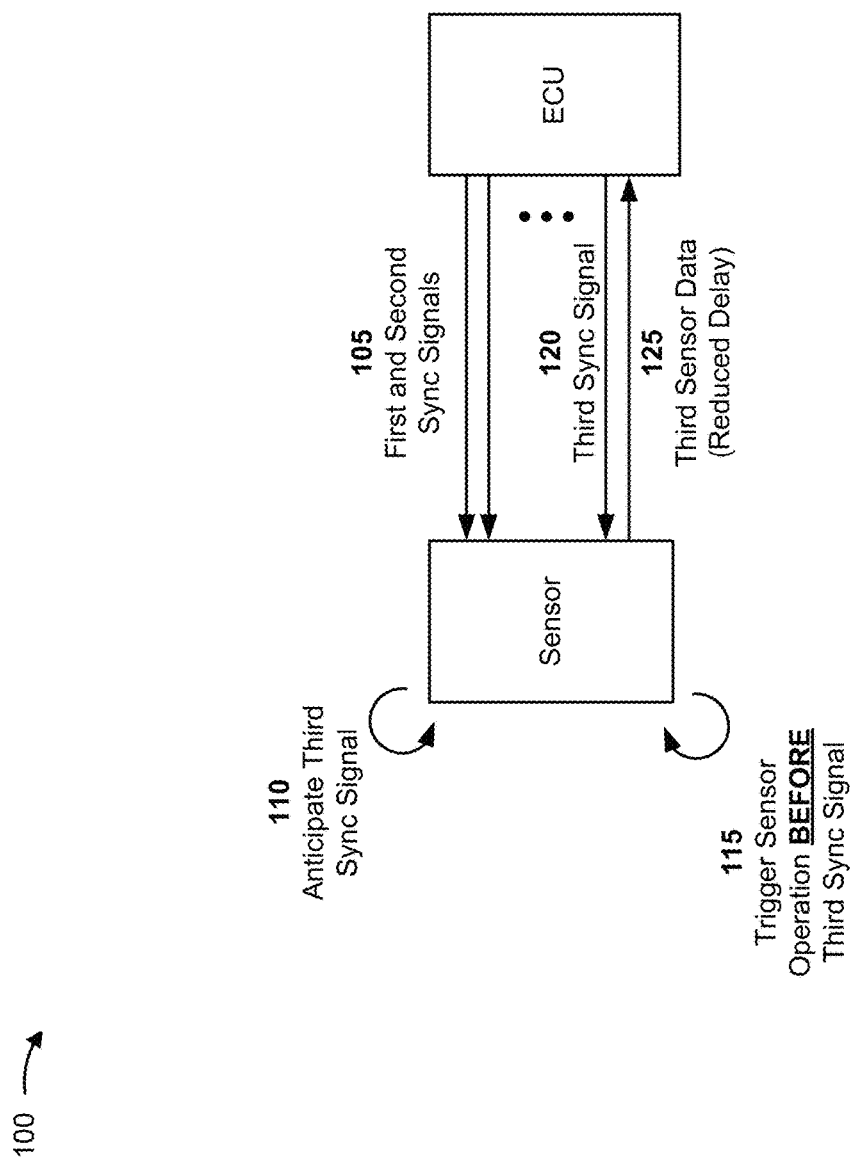
FIGS. 1A and 1B are diagrams of an overview of an example implementation described herein.

The following detailed description of example implementations refers to the accompanying drawings. The same reference numbers in different drawings may identify the same or similar elements.

An interface between a sensor and an ECU (e.g., a wired interface between a remote sensor and an ECU) is an important component in a sensor system. For example, the interface may significantly impact robustness of the sensor system since the interface contributes significantly to an overall failure-in-time (FIT) rate of the sensor system, and may significantly impact the cost of the sensor system by adding to a cost to produce, assemble, and/or maintain the sensor system. As another example, the interface may significantly impact performance of the sensor system since, the interface can act as a bottleneck for the transfer of information in the sensor system.

With regard to the impact on performance, in some cases, the performance of the sensor system may be limited by a connection bandwidth (e.g., an available gross baud rate) and/or synchronization losses between the sensor and the ECU. The connection bandwidth issue may be resolved by introducing advanced connection schemes, in some cases. However, the synchronization losses between the sensor and the ECU remain a major limitation in terms of achievable performance of the sensor system.

In general, transfer of information between a sensor and an ECU can be handled by configuring the sensor to automatically provide (e.g., without a request from the ECU) a stream of sensor data (herein referred to as a continuous data stream), or by configuring the sensor to provide sensor data based on receiving a request from the ECU.

In the case of a continuous data stream, both a sampling time (e.g., a time when the sensor samples a sensor signal) and a time at which a transmission of sensor data is initiated are determined by a clock of the sensor, which operates in a sensor clock domain. Here, the ECU needs to receive the sensor data in real-time even though the ECU may not need the sensor data until a later point in time (e.g., a later time at which ECU is to perform a computing operation using the sensor data). Therefore, the ECU must perform an operation to synchronize the sensor data with a clock of the ECU 210, which operates in an ECU clock domain that differs from the sensor clock domain.

Using such a scheme, there is a variable delay between the sensor sampling the sensor signal and use of the sensor data by the ECU. Contributors to this latency time include an amount of time needed for the sensor to perform a data calculation after sampling the sensor signal, an amount of time needed for the sensor to transmit the sensor data after performing the data calculation, and an amount of "waiting"

time between completion of the transmission of the sensor data and use of the sensor data by the ECU.

Due to the asynchronous operation of the sensor and the ECU (e.g., due to operation in different clock domains), the latency time can vary between one and two times a sum of the amount of time needed for the sensor to perform the data calculation and the amount of time needed to transmit the sensor data (herein referred to as the sensor time). In a case where a sensor update rate (e.g., a rate at which a transmission of sensor data is provided by the sensor) is higher than an ECU cycle time (e.g., an amount of time needed for the ECU to perform one computing cycle), the waiting time may vary between zero (e.g., when transmission of the sensor data is completed exactly at the point in time at which the sensor data is to be used by the ECU) and an amount of time equal to the sensor time. If the sensor time is an integer multiple of the ECU cycle time, then the waiting time may theoretically remain constant. However, due to tolerances of the sensor and the ECU clock domains, the integer multiple will not be constant and, thus, the waiting time will change each cycle, thereby introducing variation in the latency time.

In some cases, the latency time could be reduced by increasing a speed of the sensor (e.g., in order to reduce an amount of time to perform data calculation) and/or increasing a bandwidth of the interface (e.g., in order to reduce an amount of time to transmit the sensor data). Here, if dynamics of the sensor system are known, then a deviation in the sensor time, caused by different operating conditions, may be compensated by implementing an estimation algorithm in the ECU. However, the variable portion of the latency time (i.e., the waiting time) cannot be compensated in this manner. As a result, the continuous data stream technique for transfer of information between the sensor and the ECU may introduce an undesirably high and/or variable amount of synchronization error at the ECU (e.g., between approximately 0 degrees and 2.55 degrees for an angle sensor).

Configuring the sensor to provide sensor data based on receiving a request from the ECU (i.e., rather than a continuous data stream) may reduce or eliminate synchronization error caused by the clock domains of the sensor and the ECU. For example, using a conventional technique for such a synchronization scheme, the ECU may provide a synchronization signal to the sensor. Here, receipt of the synchronization signal by the sensor causes the sensor to sample a sensor signal, perform data calculation, and then transmit the sensor data to the ECU. In this case, there is no synchronization error in sensor data decoded by the ECU (e.g., since the sensor is synchronized with the ECU based on the synchronization signal provided by the ECU). However, this conventional technique has a number of drawbacks.

One drawback of the conventional technique is that a utilization rate of a sensor interface bus is relatively low since there is no communication on the bus during a time period when the sensor is sampling the sensor signal and performing the data calculation. This also leads to a reduction in a maximum possible update rate for a given interface bandwidth.

Similarly, another drawback of the conventional technique is that, since the ECU needs to access the sensor interface bus two times every update cycle (e.g., once in order to provide the synchronization signal and then again in order to receive the sensor data), the utilization rate of the sensor interface bus may be reduced since the sensor interface bus must be available for a transmission by the sensor at an expected point in time (e.g., a time at which transmission of the sensor data is expected).

Another drawback of the conventional technique is that the ECU provides the synchronization signal well before the sensor data is transmitted by the sensor. In some cases, such a delay introduces the potential errors in the sensor system.

Still another drawback of the conventional technique is that the ECU needs to switch between performing two different operations: a first operation associated with providing the synchronization signal and a second operation associated with receiving and processing the sensor data. In some cases, interruption of one operation (e.g., the second operation) to switch to another operation (e.g., the first operation) may require consumption of computing power by the ECU and, thus, should be avoided when possible.

Another drawback of the conventional technique is a limitation on an achievable sensor update rate. For example, in some sensor systems (e.g., a rotor position sensor for a drive application), a relatively high sensor update rate (e.g., one complete transmission of sensor data every 33 microseconds (μs) may be required. Here, the sensor update rate is impacted by an amount of delay associated with receiving the synchronization signal, an amount of time to sample the sensor signal, an amount of time to perform the calculation, and an amount of time to transmit the sensor data. In a typical sensor that uses the conventional synchronization technique described above, the update rate may be, for example, one complete transmission approximately every 45 μs (or worse). Thus, a relatively high sensor update rate may not be achievable using the conventional synchronization technique.

In order to enable an improved (i.e., as compared to the conventional technique) sensor update rate, either an amount of time needed to transmit the sensor data or an amount of time need to sample the sensor signal and perform the calculation could be reduced. However, due to limitations on the bandwidth of the sensor interface, increasing the transmission speed may not be possible, or would come at an unreasonable high cost (e.g., changing of a physical layer). Similarly, while a reduction of a sampling time and/or a calculation time may be achieved with faster signal processing, increasing the speed of signal processing may also come at unreasonably high cost (e.g., implementing advanced processing, implementing parallel processing, and/or the like).

Notably, while a number of techniques exist for governing transfer of sensor data (e.g., incremental interface (IIF), serial peripheral interface (SPI), single edge nibble transmission (SENT), short pulse width modulation code (SPC), pulse width modulation (PWM), analog, and/or the like), these techniques are not capable of providing acceptable interface bandwidths and/or immunity to an electromagnetic environment (EME) that is needed in order to be used by a remote sensor requiring a relatively high update rate (e.g., 33 μs or better). In some cases, an analog interface is used when a relatively high update rate is needed. However, although the analog interface may provide an acceptable update rate, the analog interface has a number of drawbacks. For example, the analog interface may require additional wires in order to facilitate data transfer (e.g., additional cost and/or complexity as compared to a digital interface), may be susceptible to electromagnetic distortions, and/or may not be compatible with a particular data processing technique (e.g., a digital processing technique) used in the sensor system. Further, the analog interface may not be capable of transferring other information associated with the sensor. For example, the analog interface may not be capable of transferring diagnostic information associated with the sensor, such as information associated with a self-diagnosis, temperature information, information associated with a checking a range of sensor input data (e.g., a magnetic field strength), and/or the like.

Some implementations described herein provide techniques for synchronization of a sensor (e.g., a remote sensor) with an ECU, via a digital interface, while achieving an improved sensor update rate (e.g., as compared to the conventional synchronization technique described above). In some implementations, such improved synchronization may be achieved by configuring the sensor based on a self-adjusting trigger technique used to anticipate an upcoming synchronization signal, as described in further detail below.

Figure 1B:
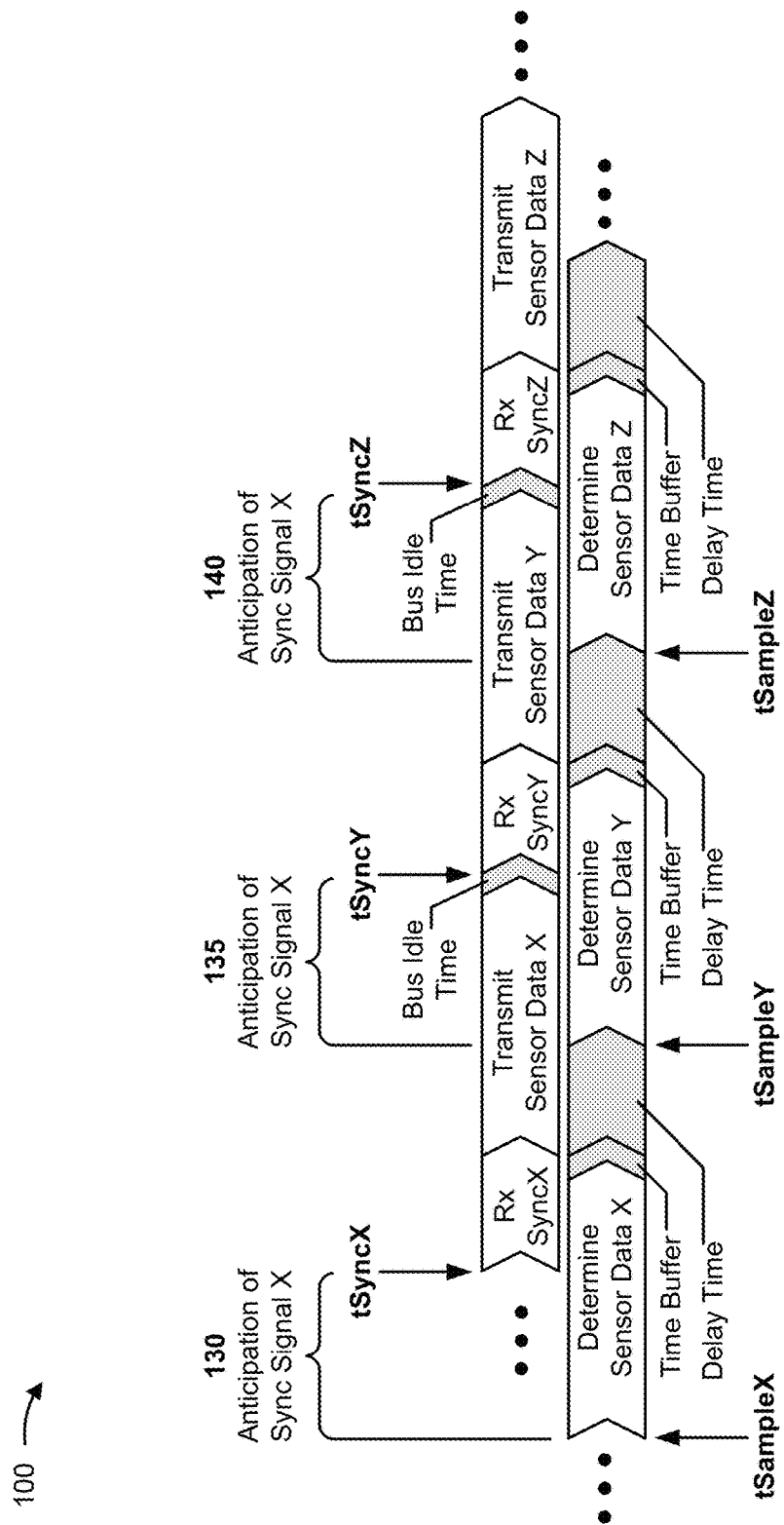

FIGS. 1A and 1B are diagrams of an overview of an example implementation 100 described herein. As shown in FIG. 1A, a sensor is connected to an ECU via a sensor interface bus (e.g., such that the sensor may provide sensor data to the ECU via the sensor interface bus). In example implementation 100, in order to synchronize the sensor with the ECU, the sensor is configured to anticipate synchronization (sync) signals (before such signals are provided by the ECU) in order to permit an improved sensor update rate while achieving synchronization via a digital interface, as described below.

As shown by reference number 105, the ECU provides (e.g., when the sensor system powers on) a group of sync signals (e.g., including a first sync signal and a second sync signal) to the sensor. For example, as shown, the ECU may provide a first sync signal that is received by the sensor at a first time. Here, the sensor may perform a sensor operation (e.g., sampling a sensor signal, calculating sensor data, etc.) and may transmit first sensor data to the ECU (not shown in FIG. 1A). The ECU may then transmit the second sync signal that is received by the sensor at a second (e.g., later) time. Once again the sensor may perform a sensor operation and may transmit second sensor data to the ECU (not shown in FIG. 1A).

As shown by reference number 110, the sensor may anticipate a third (e.g., an upcoming) sync signal based receiving the first sync signal and the second sync signal. For example, in some implementations, the sensor may determine, based on the first and second sync signals, a sampling pattern associated with sync signals received from the ECU. The sampling pattern may identify, for example, an expected amount of time between receipt of a given pair of sync signals from the ECU. Here, based on the sampling pattern with the sync signals received from the ECU, the sensor may anticipate the third sync signal. For example, the sensor may identify, based on the sampling pattern, a time point at which the sensor expects to receive the third sync signal from the ECU.

As shown by reference number 115, the sensor may trigger a sensor operation, associated with the third sync signal, based on anticipating the third sync signal. In other words, the sensor may begin performing the sensor operation before the sensor receives the third sync signal from the ECU.

In some implementations, the sensor may trigger the sensor operation based on the time point at which the sensor expects to receive the third sync signal. For example, the sensor may store, have access to, or otherwise determine an amount of time needed for the sensor to perform the sensor operation (e.g., an amount of time needed to sample a sensor signal and calculate sensor data). Here, since the sensor has identified when the third sync signal is expected, the sensor may determine a time point at which to trigger the sensor operation, associated with the third sync signal, such that third sensor data is ready for transmission at or near the time point at which the third sync signal is received. Thus, the sensor may trigger the sensor operation, associated with the third sync signal, before receiving the third sync signal from the ECU. A detailed example of such a technique is described below with regard to FIG. 1B.

As shown by reference number 120, the sensor receives the third sync signal from the ECU. Here, since the sensor has triggered the sensor operation, associated with the third sync signal, before receiving the third sync signal, the third sensor data may be ready for transmission at or near the time at which the third sync signal is received. Thus, as shown by reference number 125, the sensor may provide the third sensor data with a reduced delay (i.e., almost immediately after receiving the third sync signal).

FIG. 1B is a diagram further illustrating the example technique described in FIG. 1A. For the purposes of FIG. 1B, the sensor has determined a sampling pattern associated with receiving sync signals from the ECU (e.g., an expected amount of time between receiving a given sync signal and receiving a next sync signal).

As shown by reference number 130, the sensor may anticipate, based on the sampling pattern, receipt of sync signal X and trigger performance of a sensor operation, associated with sync signal X, accordingly. For example, based on the sampling pattern, the sensor may determine that, in order have sensor data X ready for transmission at or near a time point at which the sensor receives sync signal X, the sensor is to trigger performance of a sensor operations (e.g., determination of sensor data X) at time tSampleX. Notably, time tSampleX is before a time tSyncX at which the ECU transmits sync signal X and, thus, is before a time at which the sensor receives sync signal X. As shown, sensor data X is ready for transmission when the sensor receives sync signal X via the sensor interface bus (e.g., after Rx SyncX), and the sensor transmits sensor data X (e.g., immediately after receiving sync signal X). As shown, in some implementations, the sensor may be configured to implement a time buffer in order to, for example, ensure that sensor data X is ready for transmission before sync signal X is received.

As shown by reference number 135, the sensor may, based on the sampling pattern, anticipate receipt of sync signal Y (i.e., a next sync signal) and trigger performance of a sensor operation, associated with sync signal Y, accordingly. As shown, based on the sampling pattern, the sensor may delay triggering performance of the sensor operation until time tSampleY in order to have sensor data Y ready for transmission at or near a time point at which the sensor receives sync signal Y (e.g., after transmission by the ECU at time tSyncY). In this way, an amount of latency between sampling of the sensor signal and transmission of corresponding sensor data is reduced. Further, as shown, a period of time during which the sensor determines sensor data Y overlaps with a period of time during which the sensor transmits sensor data X. In other words, "next" sensor data may be determined while "current" sensor data is being transmitted, which allows for an improved sensor update rate, as described below.

The sensor may proceed in the manner described above for transmission of sensor data Y and, as shown by reference number 140, may proceed in a similar manner for anticipation of sync signal Z and transmission of sensor data Z associated with sync signal Z. Additional details regarding the above described processes are described below.

In this way, a sensor may be synchronized with an ECU, via a digital interface, while achieving an improved sensor update rate (e.g., as compared to the conventional synchronization technique described above).

In some implementations, a utilization rate of a sensor interface bus is increased since delay between use of the sensor interface bus for transmission of a sync signal and transmission of corresponding sensor data is reduced or eliminated. Further, since a time point at which the sensor interface bus should be available for a transmission by the sensor closely or immediately follows the transmission of the sync signal, the sensor interface bus is utilized more efficiently.

Additionally, an amount of time between transmission of the sync signal and a transmission of corresponding sensor data is reduced, which may reduce the potential for errors in the sensor system.

Furthermore, using the techniques described herein, an achievable sensor update rate is increased. For example, by anticipating a sync signal and triggering performance of a sensor operation in the manner described above, a significant amount of delay associated with a given sensor cycle is eliminated. As such, the rate at which the sensor completes cycles of determining and transmitting sensor data is improved, thereby facilitating a relatively high sensor update rate (e.g., one complete transmission every 33 µs or better).

As indicated above, FIGS. 1A and 1B are provided merely as an example. Other examples are possible and may differ from what was described with regard to FIGS. 1A and 1B.

Figure 2:
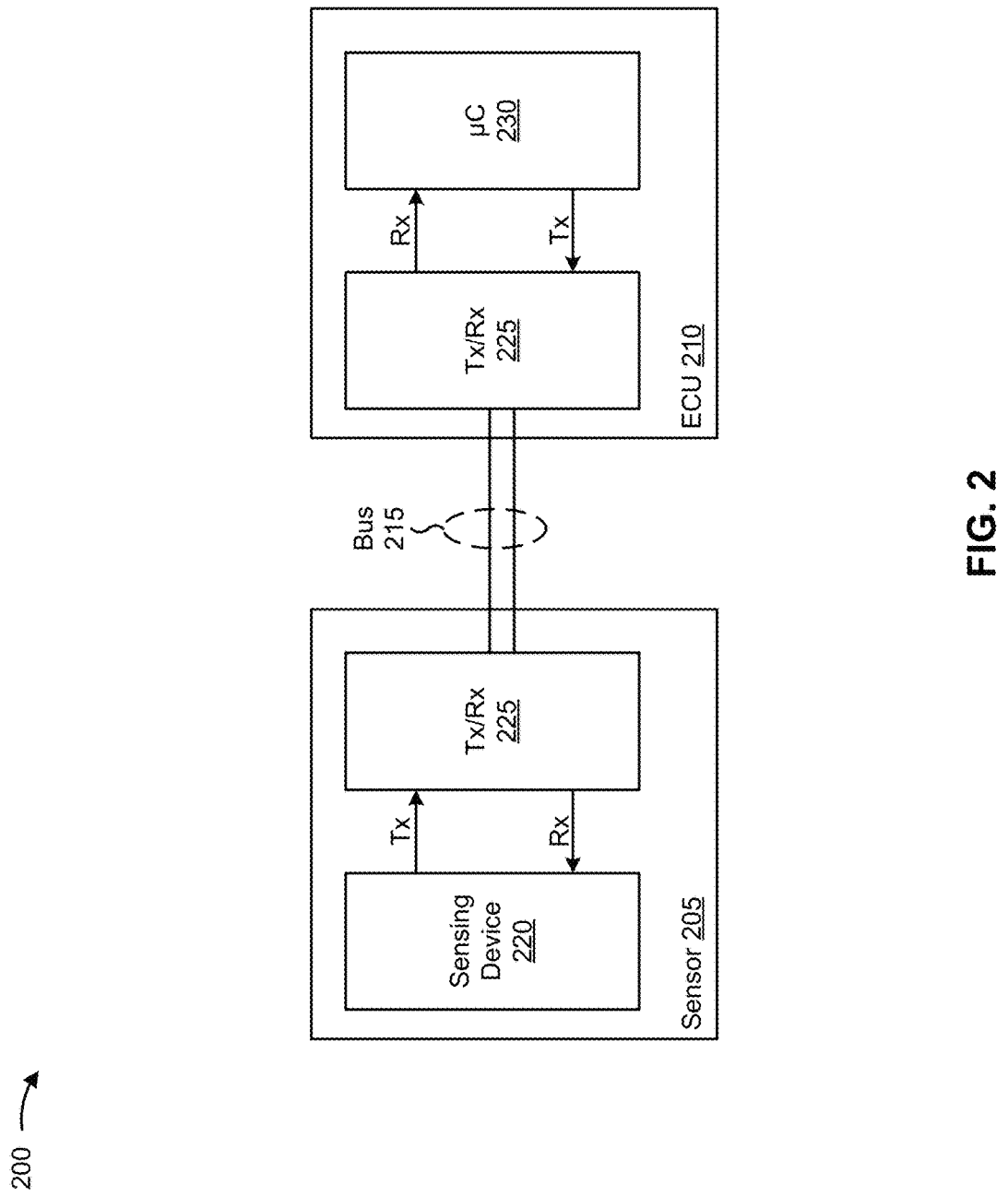
FIG. 2 is a diagram of an example environment in which systems and/or methods, described herein, may be implemented.

FIG. 2 is a diagram of an example environment 200 in which techniques and apparatuses described herein may be implemented. As shown in FIG. 2, environment 200 may a sensor 205 connected to an ECU 210 via a sensor interface bus 215 (herein referred to as bus 215).

Sensor 205 includes a housing associated with one or more components of a sensor for measuring one or more characteristics (e.g., a speed of an object, a position of an object, an angle of rotation of an object, an amount of pressure, a temperature, an amount of current, and/or the like). As shown, sensor 205 includes a sensing device 220 and a transceiver (Tx/Rx) 225. In some implementations, sensor 205 is remote from ECU 210 and, thus, is connected to ECU 210 via bus 215 (e.g., via a wired connection). Additionally, or alternatively, sensor 205 may be a local sensor (e.g., such that sensor 205 is connected to ECU 210 via a short connection, is integrated with ECU 210 on a same chip, and/or the like).

Sensing device 220 includes a device capable of performing a sensing function (e.g., sampling a sensor signal, calculating and/or determining sensor data, and/or the like). In some implementations, sensing device 220 is capable of perform operations associated with anticipating a sync signal, to be provided by ECU 210, and triggering the sensing function based on the anticipated sync signal, as described herein. In some implementations, sensing device 220 may include one or more sensing elements, an analog-to-digital convertors (ADC), a digital signal processor (DSP), a memory component, and a digital interface that enable performance of the sensing function and/or enable operations associated with anticipating a sync signal by sensing device 220.

Transceiver 225 includes a component via which a device (e.g., sensor 205, ECU 210) may transmit and receive information. For example, transceiver 225 may include a differential line transceiver, or a similar type device. In some implementations, transceiver 225 includes a transmit (Tx) component that allows sensor 205 to transmit information (e.g., sensor data, information that identifies a delay time associated with anticipating a sync signal, and/or the like) to ECU 210 via bus 215, and a receive (Rx) component that allows sensor 205 to receive information (e.g., sync signals) from ECU 210 via bus 215. In some implementations, transceiver 225 may include a line driver for enabling the Tx component (to transmit information) or the Rx component (to receive information) at a given time. In some implementations, sensor 205 may not include transceiver 225. For example, sensor 205 may not include transceiver 225 when sensor 205 is a local sensor and/or when a length of a connection between sensor 205 and ECU 210 is relatively short (e.g., as compared to an application where sensor 205 is a remote sensor).

Bus 215 includes a sensor interface bus for carrying information between sensor 205 and ECU 210. In some implementations, bus 215 may comprise a connection (e.g., including one or more wires and connectors) via which sensor 205 is connected to ECU 210. In some implementations, bus 215 may include a set of connections, each associated with one or more sensors 205 connected to ECU 210 (e.g., when multiple sensors 205 are connected to ECU 210 via one or more busses 215). In some implementations, a given connection may be capable of carrying a signal from ECU 210 to sensor 205 and carrying a signal from sensor 205 to ECU 210 (e.g., via a same wire or via a different wire).

ECU 210 includes one or more devices associated with controlling one or more electrical systems and/or electrical subsystems based on sensor data provided by sensor 205. As shown, ECU 210 may include a transceiver 225 and a controller (µC) 230. In some implementations, controller 230 may be capable of calibrating, controlling, adjusting, or the like, the one or more electrical systems and/or electrical subsystems based on sensor data transmitted by sensor 205. For example, in some implementations, controller 230 may include an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), or another electrical system or electrical subsystem of a vehicle.

As described above, transceiver 225 includes a component via which a device (e.g., sensor 205, ECU 210) may transmit and receive information. In some implementations, transceiver 225 includes a Tx component that allows ECU 210 to transmit information (e.g., sync signals) to sensor 205 via bus 215, and a Rx component that allows ECU 210 to receive information (e.g., sensor data, information that identifies a delay time associated with anticipating a sync signal, and/or the like) from sensor 205 via bus 215. In some implementations, transceiver 225 may include a line driver for enabling the Tx component (to transmit information) or the Rx component (to receive information) at a given time.

The number and arrangement of apparatuses shown in FIG. 2 is provided as an example. In practice, there may be additional devices and/or components, fewer devices and/or components, different devices and/or components, or differently arranged devices and/or components than those shown in FIG. 2. For example, in some implementations, environment 200 may include multiple sensors 205, each connected to ECU 210 via one or more associated busses 215. Furthermore, two or more devices and/or components shown in FIG. 2 may be implemented within a single devices and/or components, or a single devices and/or a single component shown in FIG. 2 may be implemented as multiple, distributed devices and/or components. Additionally, or alternatively, a set of devices and/or components (e.g., one or more devices and/or components) of FIG. 2 may perform one or more functions described as being performed by another set of devices and/or components of FIG. 2.

Figure 3:
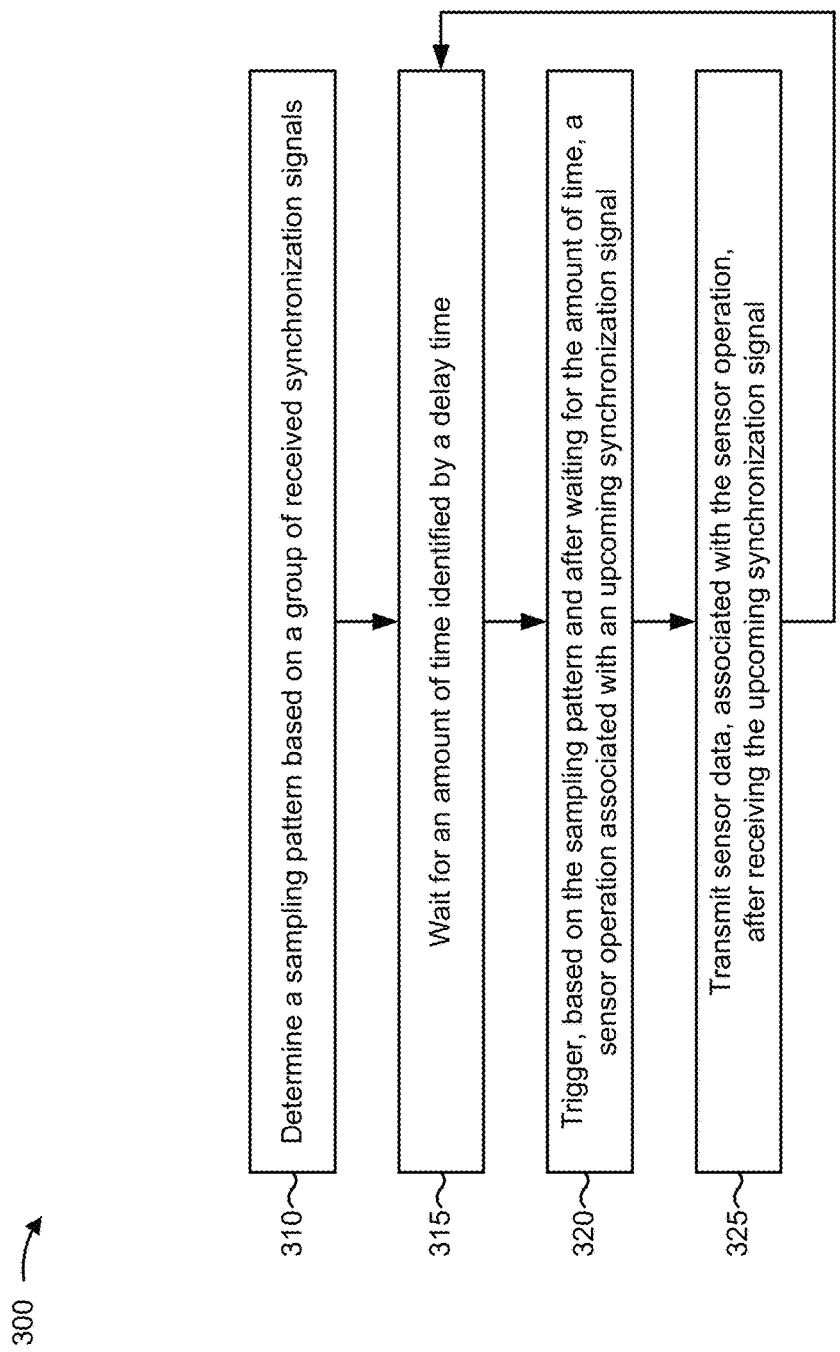
FIG. 3 is a flow chart of an example process for triggering a sensor operation, associated with an upcoming sync signal, based on a sampling pattern associated with receiving sync signals.

FIG. 3 is a flow chart of an example process 300 for triggering a sensor operation, associated with an upcoming sync signal, based on a sampling pattern associated with receiving sync signals. In some implementations, one or more process blocks of FIG. 3 may be performed by sensor 205.

As shown in FIG. 3, process 300 may include determining a sampling pattern based on a group of received synchronization signals (block 310). For example, sensor 205 may determining a sampling pattern based on a group of sync signals received from ECU 210.

The sampling pattern may include a pattern that identifies an expected amount of time between receiving sync signals provided by ECU 210. For example, the sampling pattern may identify an expected amount of time between receiving a given sync signal and a next sync signal (e.g., when sync signals are expected at a regular interval). As another example, the sampling pattern may identify a first expected about of time between receipt of a first sync signal and receipt of a second sync signal, a second expected amount of time between the receipt of the second sync signal and receipt of a third sync signal, and a third expected amount of time between receipt of the third sync signal and receipt of a fourth sync signal (e.g., when sync signals are expected in a repeating sequence of three different intervals).

In some implementations, sensor 205 may determine the sampling pattern based on receiving a group of sync signals. For example, sensor 205 may receive a first sync signal at a first time, a second sync signal at a second time, and a third sync signal at a third time. Here, sensor 205 may determine the sampling pattern as an average (e.g., a weighted average) of a time difference between the third time and the second time and a time difference between the second time and the first time. Additionally, or alternatively, sensor 205 may determine the sampling pattern based on identifying a (e.g., repeating) pattern of time differences between pairs of sync signals. For example, In some implementations, sensor 205 may update and/or modify the sampling pattern based on receiving additional sync signals. Continuing with the above described example, sensor 205 may determine the sampling pattern as a weighted average of the time difference between the third time and the second time and the time difference between the second time and the first time (e.g., where the time difference between the third time and the second time receives more weight than the time difference between the second time and the first time). Here, upon receiving a fourth sync signal at a fourth (e.g., later) time, sensor 205 may update the sampling pattern by determining a weighted average of a time difference between the fourth time and the third time, the time difference between the third time and the second time, and the time difference between the second time and the first time (e.g., where the time difference between the fourth time and the third time receives more weight than the time difference between the third time and the second time and the time difference between the second time and the first time).

In some implementations, sensor 205 may determine the sampling pattern when, for example, sensor 205 powers on, starts-up, resets, and/or the like. For example, after powering on, sensor 205 may receive a first sync signal, perform an associated sensor operation, and provide first sensor data. Sensor 205 may then receive a second sync signal, perform the associated sensor operation, and provide second sensor data. In this example, sensor 205 may determine (e.g., concurrently with performing the sensor operation associated with the second sync signal) the sampling pattern based on a time of receipt of the first sync signal and a time of receipt of the second sync signal. As described below, based on the sampling pattern, sensor 205 may identify an expected time for receiving a third sync signal and trigger a sensor operation associated with the third sync signal (e.g., before receiving the third sync signal). In this example, after receiving the third sync signal, sensor 205 may update, modify, recalculate, and/or the like, the sampling pattern based on a time of receipt of the third sync signal.

In some implementations, the sampling pattern may be used to identify an expected time for receiving an upcoming synchronization signal (e.g., a time at which sensor 205 may expect to receive an upcoming sync signal). For example, sensor 205 may identify the expected time based on the sampling pattern and a time at which a previous (e.g., most recent) sync signal was received. As a particular example, if sensor 205 receives a sync signal at a particular time, then sensor 205 may determine an expected time, associated with the upcoming (e.g., next) sync signal, by adding an amount of time between receiving sync signals, identified by the sampling pattern, to the particular time at which the sync signal was received. Here, a result of adding the amount of time, identified by the sampling pattern, to the particular time at which the sync signal was received may identify the expected time of the upcoming sync signal.

As further shown in FIG. 3, process 300 may include triggering, based on the sampling pattern, a sensor operation associated with the upcoming synchronization signal (block 320). For example, sensor 205 may trigger, based on the sampling pattern, a sensor operation associated with the upcoming synchronization signal. In some implementations, the sensor operation may include, for example, sampling of a sensor signal and calculation of a sensor data based on sampling the sensor signal (herein collectively referred to as determination of sensor data).

In some implementations, sensor 205 may trigger the sensor operation, associated with the upcoming sync signal, based on an expected time for receiving the upcoming sync signal that is identified based on the sampling pattern. For example, sensor 205 may store, have access to, or determine an amount of time needed for sensor 205 to perform the sensor operation (e.g., an amount of time needed to sample a sensor signal and calculate sensor data). As a particular example, in some implementations, sensor 205 may determine the amount of time needed for sensor 205 to perform the sensor operation based on averaging amounts of time, associated with different cycles of performing the sensor operation by sensor 205. In some implementations, the amount of time need for sensor 205 to perform the sensor operation may be relatively consistent for each sensor cycle (e.g., such that sensor 205 may store information that identifies the amount of time and reuse the information).

Continuing with the above example, sensor 205 may determine, based on the sampling pattern, an expected time for receiving the upcoming sync signal. Here, based on the amount of time needed for sensor 205 to perform the sensor operation and the expected time for receiving the upcoming sync signal, sensor 205 may determine an amount of time that sensor 205 should wait (e.g., a delay time) before triggering performance of the sensor operation associated with the upcoming sync signal. In some implementations, the delay time may be an amount of time that sensor 205 is to wait after completing one cycle of the sensor operation (e.g., associated with a previously received synchronization signal) before initiating another cycle of the sensor operation. In some implementations, sensor 205 may be configured to determine the delay time such that sensor data, associated with the upcoming sync signal, is ready for transmission at or near (e.g., prior to) a time at which sensor 205 expects to receive the upcoming sync signal. In some implementations, as indicated in block 315 of FIG. 3, sensor 205 may wait for an amount of time, identified by the delay time, before triggering the performance of the sensor operation.

In some implementations, sensor 205 may be configured to implement a time buffer (e.g., an additional amount of time) in the delay time in order to ensure that the sensor data, associated with the upcoming sync signal, is ready for transmission before the sync signal (e.g., in order to prevent timing errors, prevent late transmission of sensor data, improve utilization of bus 215, and/or the like). In some implementations, sensor 205 may be configured to automatically adjust the delay time in order to ensure that the time buffer is provided, as described below with regard to FIGS. 5 and 6.

In this way, sensor 205 may anticipate the upcoming sensor signal and trigger performance of a sensor operation, associated with the upcoming sync signal, before receiving the upcoming sync signal.

As further shown in FIG. 3, process 300 may include transmitting sensor data, associated with the sensor operation, after receiving the upcoming synchronization signal (block 325). For example, sensor 205 may transmit the sensor data, associated with the sensor operation, after sensor 205 receives the upcoming synchronization signal (e.g., after sensor 205 completes the performance of the sensor operation). In some implementations, the sensor data may include information that identifies an actual time buffer, associated with the upcoming synchronization signal, as described elsewhere herein. In some implementations, sensor 205 may transmit the sensor data, associated with the upcoming synchronization signal, during a time period that at least partially overlaps (i.e., concurrently with) a time period during which sensor 205 waits for another upcoming synchronization signal.

In some implementations, as indicated in FIG. 3, process 30 may be repeated in association with anticipating additional (e.g., later) synchronization signals.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
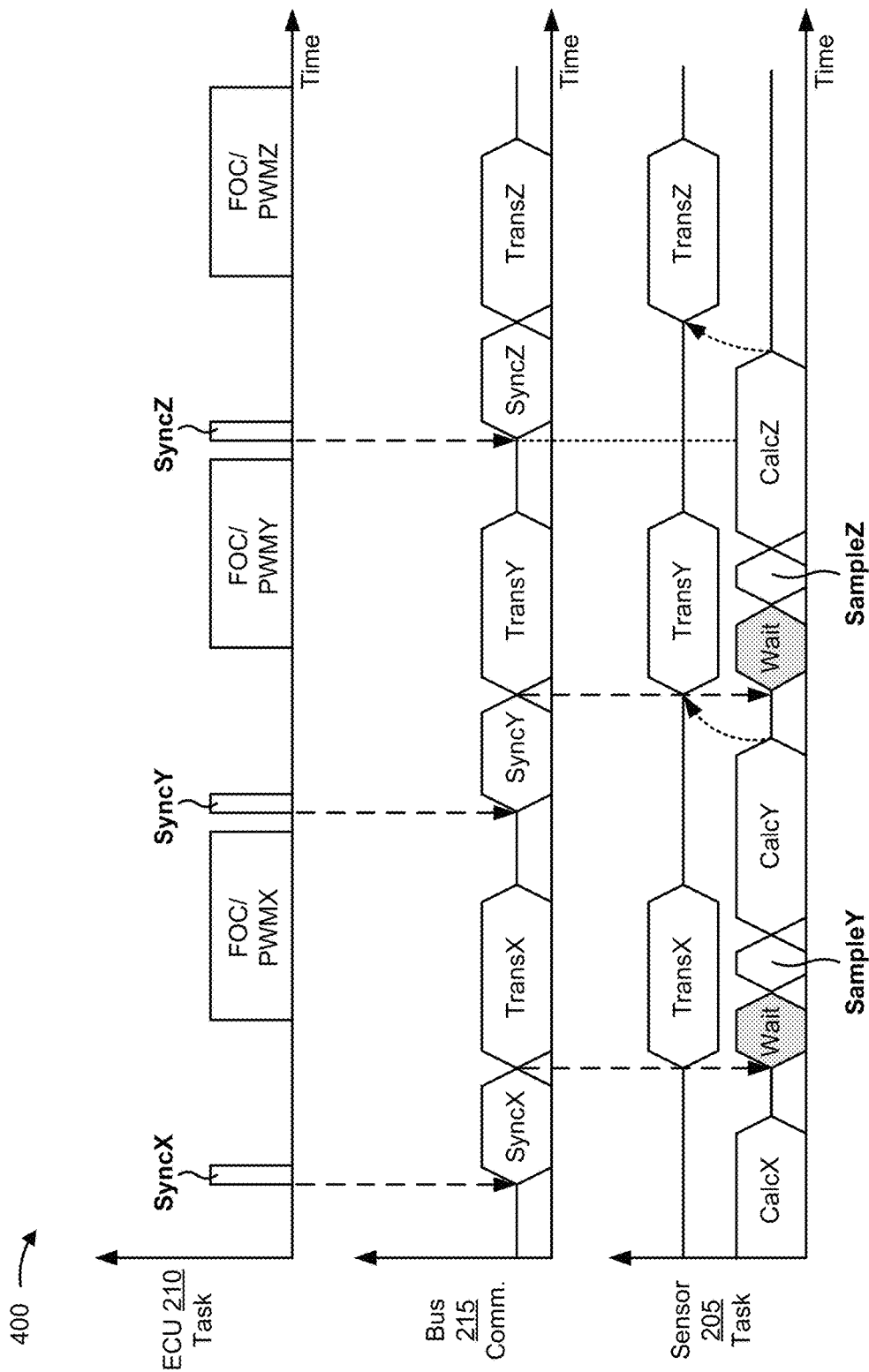
FIG. 4 is a diagram of an example implementation associated with the example process shown in FIG. 3.

FIG. 4 is a diagram of an example implementation 400 associated with example process 300 of FIG. 3. For the purposes of example implementation 400, sensor 205 has identified, based on previously received sync signals, a sampling pattern that identifies an amount of time between receiving a given pair of sync signals provided by ECU 210.

As shown in a lower portion of the sensor 205 task timeline of FIG. 4, sensor 205 has triggered performance of a sensor operation (CalcX), associated with sync signal X, based on anticipating receipt of sync signal X in accordance with the sampling pattern. As shown in the ECU 210 task timeline, ECU 210 transmits sync signal X (SyncX) after sensor 205 has started determining sensor data X. As shown by the bus 215 communication timeline, sensor 205 receives sync signal X via bus 215.

As further shown by the lower portion of the sensor 205 task timeline, sensor data X is ready before sensor 205 receives sync signal X. Thus, as shown by the upper portion of the sensor 205 task timeline and the bus 215 communication timeline, sensor 205 transmits sensor data X immediately after receiving sync signal X (TransX). As further shown by the ECU 210 task timeline, ECU 210 may being receiving sensor data X and performing one or more operations associated with sensor data X (e.g., pre-processing, field oriented control (FOC) calculation, space vector PWM (SVPWM), and/or the like).

As further shown by the lower portion of the sensor task timeline, sensor 205 may anticipate sync signal Y (i.e., a next sync signal) based on the sampling interval, and may trigger a sensor operation associated with sync signal Y (e.g., SampleY and CalcY) before receiving sync signal Y. As shown, sensor 205 may wait for a particular amount of time (e.g., a delay time) before triggering the sensor operation associated with sync signal Y such that sensor data Y is ready for transmission before sensor 205 receives sync signal Y. Sensor 205 and ECU 210 may proceed in a manner similar to that described above in order to allow ECU 210 to receive sensor data Y and sensor data Z (e.g., associated with a subsequent sync signal).

In some implementations, sensor 205 may adjust the delay time in order to implement a time buffer associated with ensuring that a given item of sensor data, associated with an anticipated sync signal, is ready for transmission by a time that sensor 205 receives the anticipated sync signal, as described below.

As indicated above, FIG. 4 is provided merely as an example. Other examples are possible and may differ from what was described with regard to FIG. 4.

Figure 5:
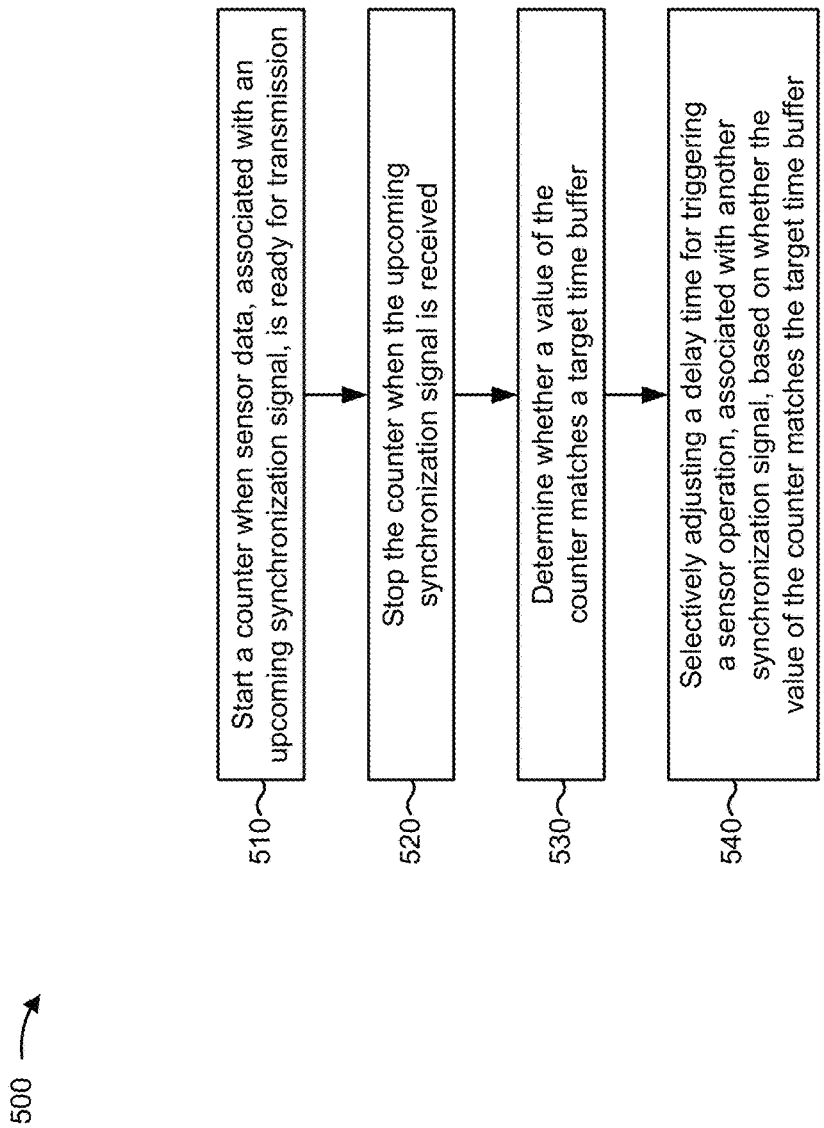
FIG. 5 is a flow chart of an example process for selectively adjusting a delay time for triggering a sensor operation associated with an upcoming synchronization signal.

FIG. 5 is a flow chart of an example process 500 for selectively adjusting a delay time for triggering a sensor operation associated with an upcoming synchronization signal. In some implementations, one or more process blocks of FIG. 5 may be performed by sensor 205.

As shown in FIG. 5, process 500 may include starting a counter when sensor data, associated with an upcoming synchronization signal, is ready for transmission (block 510). For example, sensor 205 may start a counter when sensor data, associated with an upcoming sync signal, is ready for transmission.

In some implementations, sensor 205 may start the counter when sensor 205 determines sensor data for an upcoming sync signal. For example, with reference to FIG. 4, sensor 205 may start the counter when sensor 205 determines sensor data X associated with upcoming sync signal X (e.g., sensor 205 may start the counter at the end of the CalcX block on the lower portion of the sensor 205 task timeline, before sensor 205 receives sync signal X).

As further shown in FIG. 5, process 500 may include stopping the counter when the upcoming synchronization signal is received (block 520). For example, sensor 205 may stop the counter when the upcoming sync signal is received.

In some implementations, sensor 205 may stop the counter when sensor 205 receives the upcoming sync signal. For example, with reference to FIG. 4, sensor 205 may stop the counter when sensor 205 receives sync signal X from ECU 210 (e.g., sensor 205 may stop the counter at the end of the Sync X block on the bus 215 communication timeline).

As further shown in FIG. 5, process 500 may include determining whether a value of the counter matches a target time buffer (block 530). For example, sensor 205 may determine whether a value of the counter matches a target time buffer.

The value of the counter represents an amount of time between a time at which sensor data, associated with a sync signal, is ready for transmission, and a time at which a sync signal, associated with transmitting the sensor data, is received. In other words, the value of the counter represents an actual time buffer between a time at which a determination of sensor data is complete and a time at which the sensor data is to be transmitted.

The target time buffer identifies a target time buffer to be implemented by sensor 205 in order to, for example, ensure that the sensor data, associated with the upcoming sync signal, is ready for transmission before the sync signal (e.g., in order to prevent timing errors, prevent late transmission of sensor data, improve utilization of bus 215, and/or the like). In some implementations, sensor 205 may store or have access to information that identifies the target time buffer (e.g., the target time buffer may be configured on sensor 205).

In some implementations, sensor 205 may determine whether the value of the counter (i.e., the actual time buffer) matches the target time buffer based on comparing the value of the counter and the target time buffer. For example, if sensor 205 determines that the value of the counter differs from (e.g., is less than or is greater than) the target time buffer by an amount of time that is more than a threshold amount (e.g., 0.2 μs, 0.5 μs, 2 μs, and/or the like), then sensor 205 may determine that the value of the counter does not match the target time buffer. As another example, if sensor 205 determines that the value of the counter differs from the target time buffer by an amount of time that is less than or equal to the threshold amount, then sensor 205 may determine that the value of the counter matches the target time buffer.

As further shown in FIG. 5, process 500 may include selectively adjusting a delay time for triggering a sensor operation, associated with another synchronization signal, based on whether the value of the counter matches the target time buffer (block 540). For example, sensor 205 may selectively adjust a delay time for triggering a sensor operation, associated with another synchronization signal, based on whether the value of the counter matches the target time buffer.

In some implementations, when the value of the counter matches the target time buffer, selectively adjusting the delay time may include refraining from adjusting the delay time. For example, if sensor 205 determines that the value of the counter matches the target time buffer, then no adjustment to the delay time may be needed (e.g., since the target time buffer is already being implemented by sensor 205).

In some implementations, when the value of the counter does not match the target time buffer, selectively adjusting the delay time may include increasing or decreasing the delay time associated with triggering a sensor operation for another sync signal (e.g., a next sync signal). For example, if sensor 205 determines that the value of the counter does not match the target time buffer, and the value of the counter is less than the target time buffer (i.e., that the actual time buffer is shorter than the target time buffer by more than a threshold amount), then sensor 205 may adjust the delay time by decreasing the delay time. Here, by decreasing the delay time, sensor 205 causes the sensor operation, associated with the other sync signal, to be triggered at a comparatively earlier time, which results in a comparatively longer actual time buffer when sensor 205 transmits sensor data associated with the other sync signal.

As another example, if sensor 205 determines that the value of the counter does not match the target time buffer, and the value of the counter is greater than the target time buffer (i.e., that the actual time buffer is longer than the target time buffer by more than a threshold amount), then sensor 205 may adjust the delay time by increasing the delay time. Here, by increasing the delay time, sensor 205 causes the sensor operation, associated with the other sync signal, to be triggered at a comparatively later time, which results in a comparatively shorter actual time buffer when sensor 205 transmits sensor data associated with the other sync signal.

In some implementations, sensor 205 may adjust the delay time in order to cause an actual time buffer, associated with another sync signal, to match the target time buffer. For example, sensor 205 may adjust the day time by an amount of time that corresponds to a difference between the computed actual time buffer and the target time buffer configured on sensor 205. As another example, sensor 205 may adjust the delay time by a particular amount (e.g., an incremental amount, configured on sensor 205, that is less than the difference between the computed actual time buffer and the target time buffer).

In this way, sensor 205 may selectively adjust the delay time in order to ensure that sensor data, associated with an upcoming sync signal, is ready for transmission before the sync signal, without introducing an undesirable amount of latency between performance of a sensor operation and transmission of corresponding sensor data.

In some implementations, sensor 205 may transmit information that identifies the counter value (i.e., information that identifies a length of the actual time buffer). For example, in addition to transmitting sensor data, associated with a given sync signal, sensor 205 may transmit information that identifies the counter value (e.g., in a same data output frame). In some implementations, the information that identifies the counter value may be used by ECU 210 to improve accuracy of the sensor system by, for example, reducing latency time jitter.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
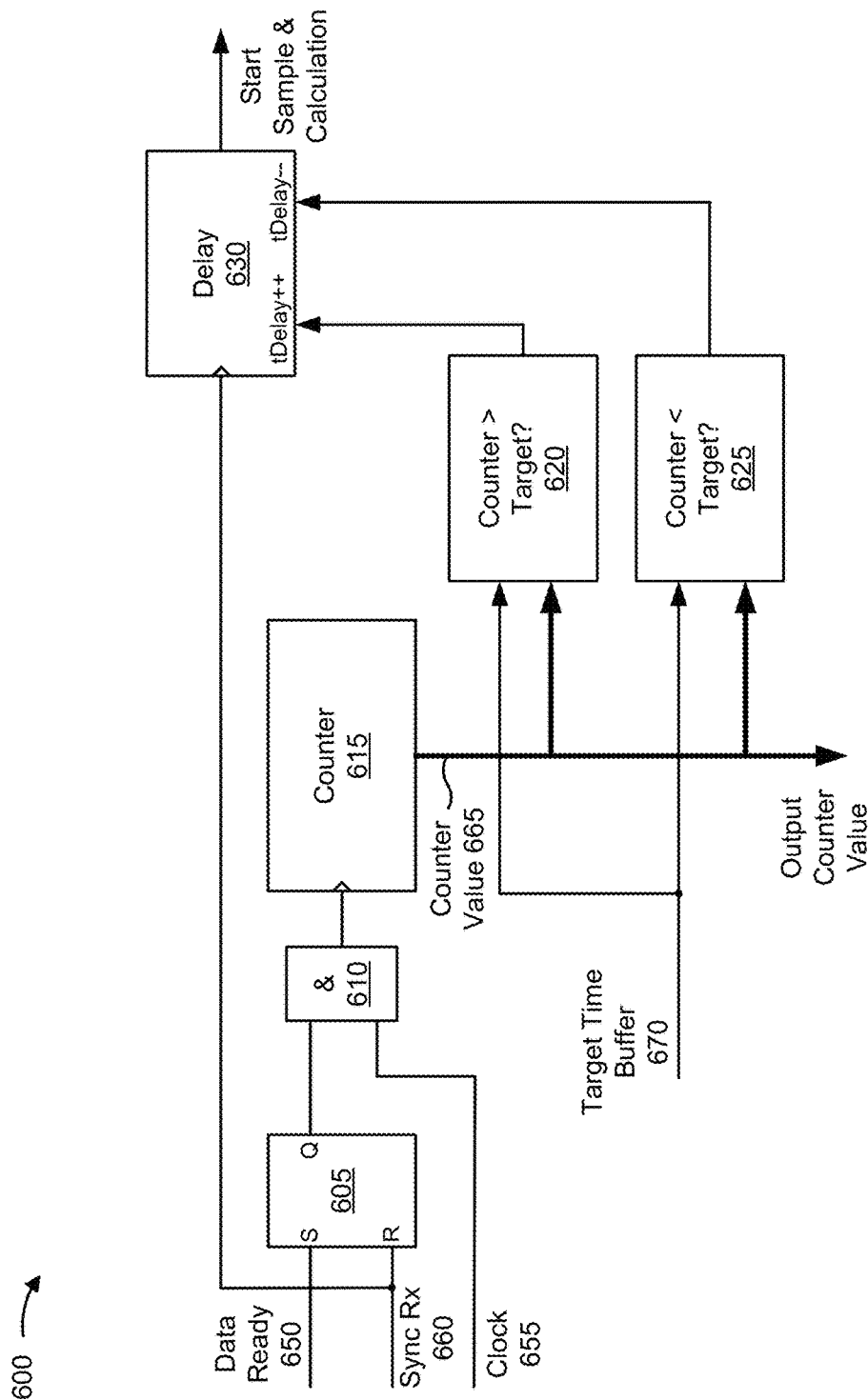
FIG. 6 is a diagram of an example implementation associated with example process shown in FIG. 5.

FIG. 6 is a diagram of an example implementation 600 associated with example process 500 of FIG. 5. In some implementations, example implementation 600 may be implemented in one or more components or devices included in sensing device 220 described above.

As shown in FIG. 6, component 605 (e.g., a set-reset (SR) component) may receive an indication 650 indicating that sensor data, associated with an upcoming sync signal, is ready for transmission. As further shown, an output of component 605 is provided to component 610 (e.g., an AND gate) that also receives a clock 655. Here, counter 615 starts based on the output of component 605 in response to indication 650, where counter 615 starts counting based on clock 655.

As further shown, component 605 may receive (e.g., at a later time) an indication 660 indicating that the upcoming sync signal, associated with the sensor data, has been received by sensor 205. Here, an output of component 605, in response to indication 660, changes an output of component 610. Here, based on the changed output of component 610, counter 615 stops counting.

As further shown, after counter 615 stops, counter 615 outputs counter value 665 that identifies a value of counter 615 at the time that counter 615 stopped counting. As shown, counter 615 may provide counter value 665 to component 620 (e.g., a first comparator) and to component 625 (e.g., a second comparator). In this example, component 620 is configured to determine whether counter value 665 is greater than target time buffer 670 by more than a threshold amount, and component 625 is configured to determine whether counter value 665 is less than target time buffer 670 by more than a threshold amount. As further shown, in some implementations, counter 615 may provide counter value 665 for output with the sensor data, as described above.

Continuing with this example, if component 620 determines that counter value 665 is greater than target time buffer 670 by more than the threshold amount, then component 620 may provide, to delay component 630, an output that causes a delay time, implemented by delay component 630 in association with a sensor operation for another (e.g., next) sync signal, to be increased (e.g., by an incremental amount tDelay++). Conversely, if component 620 determines that counter value 665 is not greater than target time buffer 670, then component 620 may provide no such output.

Similarly, if component 625 determines that counter value 665 is less than target time buffer 670 by more than the threshold amount, then component 625 may provide, to delay component 630, an output that causes the delay time to be decreased (e.g., by an incremental amount tDelay−−). Conversely, if component 625 determines that counter value 665 is not less than target time buffer 670, then component 625 may provide no such output.

Here, delay component 630 causes sensor 205 to trigger a sensor operation, associated with another sync signal, in accordance with the delay time stored on delay component 630. In some implementations, the above process may be repeated for multiple (e.g., successive) cycles in order to continuing adjusting the delay time, as needed.

As indicated above, FIG. 6 is provided merely as an example. Other examples are possible and may differ from what was described with regard to FIG. 6.

Figure 7:
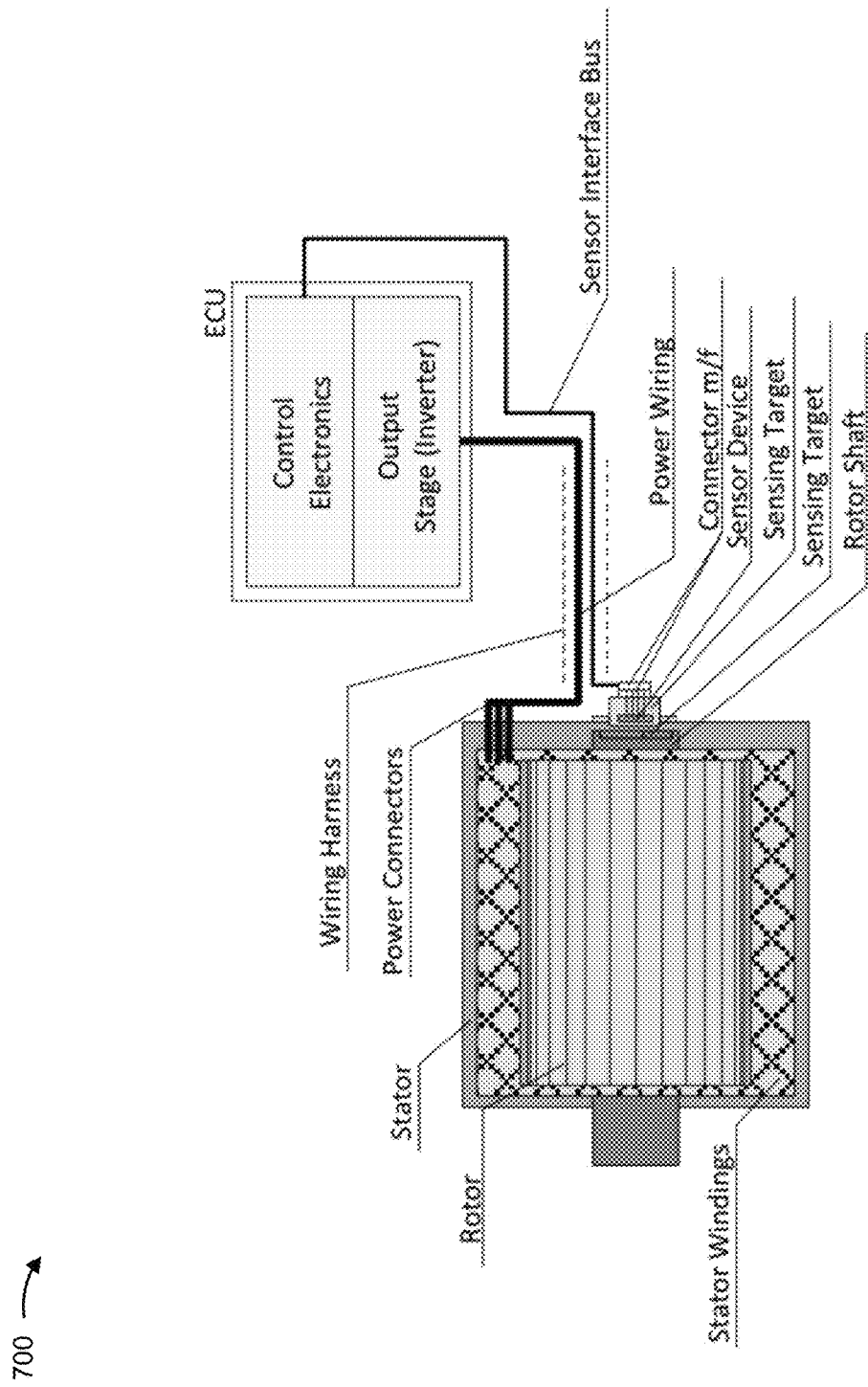
FIG. 7 is a diagram illustrating an example application of the sensor system described herein.

FIG. 7 is a diagram associated with an example application 700 of the sensor system described herein. As shown in FIG. 7, the sensor system, described herein, may be implemented in a motor control application. For example, for the reasons described above, an ECU may be separated from a motor in such an application. Thus, a sensor (e.g., an end-of-shaft a rotor position sensor or an out-of-shaft rotor position sensor) cannot be embedded in or positioned near the ECU.

In such a case, the sensor may be synchronized with the ECU, via a digital interface, and while achieving an improved sensor update rate (e.g., as compared to the conventional synchronization technique, using the techniques described herein As indicated above, FIG. 7 is provided merely as an example. Other examples are possible and may differ from what was described with regard to FIG. 7.

Some implementations described herein provide techniques for apparatuses for synchronization of a sensor (e.g., a remote sensor) with an ECU, via a digital interface, while achieving an improved sensor update rate (e.g., as compared to the conventional synchronization technique described above). In some implementations, such improved synchronization may be achieved by configuring the sensor based on a self-adjusting trigger technique used to anticipate an upcoming synchronization signal, as described in further detail below.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sensor, comprising:
one or more components to:
determine a sampling pattern based on a group of synchronization signals received by the sensor,
wherein the sampling pattern identifies an expected time for receiving an upcoming synchronization signal; and
trigger, based on the sampling pattern, a performance of a sensor operation associated with the upcoming synchronization signal,
wherein the performance of the sensor operation is triggered before the upcoming synchronization signal is received.

2. The sensor of claim 1, wherein the one or more components are further to:
receive the upcoming synchronization signal; and
transmit sensor data, resulting from the performance of the sensor operation, based on receiving the upcoming synchronization signal.

3. The sensor of claim 2, wherein the sensor data includes information that identifies a counter value corresponding to an actual time buffer associated with the upcoming synchronization signal.

4. The sensor of claim 2, wherein the one or more components, when transmitting the sensor data, are to:
transmit the sensor data during a period of time that at least partially overlaps with a period of time during which a performance of a sensor operation, associated with another upcoming synchronization signal, is triggered.

5. The sensor of claim 1, wherein the one or more components are further to:
  transmit sensor data, associated with a received synchronization signal, during a time period that at least partially overlaps a time period during which the performance of the sensor operation, associated with the upcoming synchronization signal, is triggered.

6. The sensor of claim 1, wherein the one or more components, when determining the sampling pattern, are to:
  determine the sampling pattern based on a time difference between a time at which a first synchronization signal is received and a time at which a second synchronization signal is received,
    wherein the first synchronization signal and the second synchronization signal are included in the group of synchronization signals.

7. The sensor of claim 1, wherein the one or more components, when triggering the sensor operation, associated with the upcoming synchronization signal, are to:
  trigger the performance of the sensor operation based on a delay time that causes the sensor to wait, after receiving a previous synchronization signal, before triggering the performance of the sensor operation.

8. The sensor of claim 1, wherein the one or more components are further to:
  receive the upcoming synchronization signal;
  determine an actual time buffer based on receiving the upcoming synchronization signal; and
  selectively adjust a delay time, associated with triggering a sensor operation associated with another upcoming synchronization signal, based on whether the actual time buffer matches a target time buffer associated with the upcoming synchronization signal.

9. The sensor of claim 1, wherein the sensor operation is an operation associated with sampling a sensor signal.

10. A system, comprising:
  a sensor to:
    determine a sampling pattern based on a group of synchronization signals received by the sensor,
      wherein the sampling pattern identifies a time at which an upcoming synchronization signal is expected to be received by the sensor; and
    perform, based on the sampling pattern, a sensor operation associated with the upcoming synchronization signal,
      wherein the sensor operation is performed such that sensor data, associated with the sensor operation, is ready to be transmitted by the time at which the upcoming synchronization signal is expected to be received.

11. The system of claim 10, wherein the sensor is further to:
  receive the upcoming synchronization signal; and
  transmit the sensor data, associated with the sensor operation, based on receiving the upcoming synchronization signal,
    wherein the sensor data is transmitted during a period of time that at least partially overlaps a period of time during which the sensor performs a sensor operation associated with another upcoming synchronization signal.

12. The system of claim 11, wherein the sensor data includes information that identifies a counter value corresponding to an actual time buffer associated with the upcoming synchronization signal.

13. The system of claim 10, wherein the sensor is further to:
  transmit other sensor data, associated with a received synchronization signal, during a period of time that at least partially overlaps a period of time during which the sensor operation, associated with the upcoming synchronization signal, is performed.

14. The system of claim 10, wherein the sensor, when determining the sampling pattern, is to:
  determine the sampling pattern based on a time difference between a time at which a first synchronization signal is received and a time at which a second synchronization signal is received,
    wherein the first synchronization signal and the second synchronization signal are included in the group of synchronization signals.

15. The system of claim 10, wherein the sensor, when performing the sensor operation, associated with the upcoming synchronization signal, is to:
  perform the sensor operation based on a delay time that causes the sensor to wait, after receiving a previous synchronization signal, before performing of the sensor operation.

16. The system of claim 10, wherein the sensor is further to:
  receive the upcoming synchronization signal;
  determine whether an actual time buffer, associated with receiving the upcoming synchronization signal, matches a target time buffer; and
  selectively adjust a delay time, associated with triggering a sensor operation associated with another upcoming synchronization signal, based on whether the actual time buffer matches the target time buffer associated with the upcoming synchronization signal,
    wherein the system, when selectively adjusting the delay time, is to:
      refrain from adjusting the delay time when the actual time buffer matches the target time buffer;
      increase the delay time when the actual time buffer does not match the target time buffer and the actual time buffer is longer than the target time buffer; or
      decrease the delay time when the actual time buffer does not match the target time buffer and the actual time buffer is shorter than the target time buffer.

17. A method, comprising:
  determining a sampling pattern based on receiving a group of synchronization signals,
    wherein the sampling pattern identifies an expected time for receiving an upcoming synchronization signal; and
  triggering and based on the sampling pattern, a performance of a sensor operation associated with the upcoming synchronization signal,
    wherein the performance of the sensor operation is triggered before the upcoming synchronization signal is received by a sensor.

18. The method of claim 17, further comprising:
  receiving the upcoming synchronization signal; and
  transmitting sensor data, resulting from the performance of the sensor operation, based on receiving the upcoming synchronization signal;
    wherein the sensor data is transmitted during a period of time that at least partially overlaps with a period of time during which a performance of a sensor operation, associated with another upcoming synchronization signal, is triggered.

19. The method of claim 18, wherein the sensor data includes information that identifies a counter value corresponding to a length of an actual time buffer associated with the upcoming synchronization signal.

20. The method of claim 17, further comprising:
receiving the upcoming synchronization signal;
determining an actual time buffer based on receiving the upcoming synchronization signal; and
selectively adjust a delay time, associated with triggering a sensor operation associated with another upcoming synchronization signal, based on whether the actual time buffer matches a target time buffer associated with the upcoming synchronization signal.

* * * * *